United States Patent
Suzuki et al.

(10) Patent No.: US 11,619,934 B2
(45) Date of Patent: Apr. 4, 2023

(54) VEHICLE REMOTE CONTROL METHOD AND VEHICLE REMOTE CONTROL DEVICE

(71) Applicant: Nissan Motor Co., Ltd., Yokohama (JP)

(72) Inventors: Yasuhiro Suzuki, Kanagawa (JP); Junya Kobayashi, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 17/641,282

(22) PCT Filed: Sep. 9, 2019

(86) PCT No.: PCT/IB2019/001028
§ 371 (c)(1),
(2) Date: Mar. 8, 2022

(87) PCT Pub. No.: WO2021/048580
PCT Pub. Date: Mar. 18, 2021

(65) Prior Publication Data
US 2022/0365527 A1    Nov. 17, 2022

(51) Int. Cl.
*G05D 1/00*  (2006.01)
*B60W 30/06* (2006.01)

(52) U.S. Cl.
CPC .......... *G05D 1/0016* (2013.01); *B60W 30/06* (2013.01)

(58) Field of Classification Search
CPC .............................. B60W 30/06; G05D 1/0016
USPC ........................................................... 701/2
See application file for complete search history.

(56) References Cited

U.S. PATENT DOCUMENTS

2016/0023665 A1* 1/2016 Sherony .............. G02B 27/01
                                                    701/2
2016/0170494 A1* 6/2016 Bonnet ................ B60K 35/00
                                                    345/173

FOREIGN PATENT DOCUMENTS

| EP | 3163404 A1 | 5/2017 |
| EP | 4030773 A1 * | 7/2022 |
| JP | 2016-074285 A | 5/2016 |
| JP | 2016-538780 A | 12/2016 |
| JP | 2018-127066 A | 8/2018 |
| JP | 2019-061686 A | 4/2019 |

\* cited by examiner

*Primary Examiner* — Peter D Nolan
*Assistant Examiner* — Luke Huynh
(74) *Attorney, Agent, or Firm* — Young Basile Hanlon & MacFarlane, P.C.

(57) ABSTRACT

When a subject vehicle having an autonomous travel control function is remotely operated with a remote operation device, detected coordinate information indicating a temporal transition in detected coordinates of a gesture detected by a touch panel of the controller is acquired, and the change amount of a physical change occurring on the remote operation device is detected to acquire operation device transition information indicating a temporal transition in the change amount. Then, the frequency characteristics of the detected coordinate information are compared with the frequency characteristics of the operation device transition information to determine whether or not there is correlation, and when there is correlation, the subject vehicle is controlled to execute autonomous travel control.

9 Claims, 15 Drawing Sheets

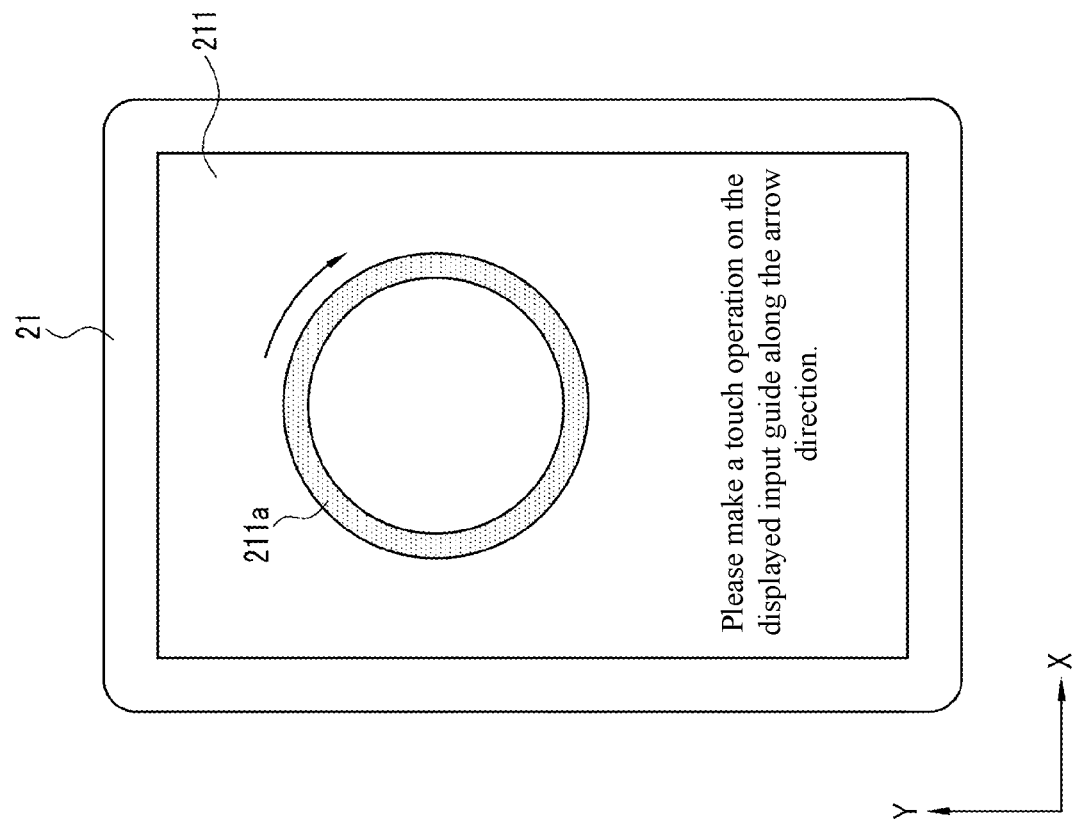

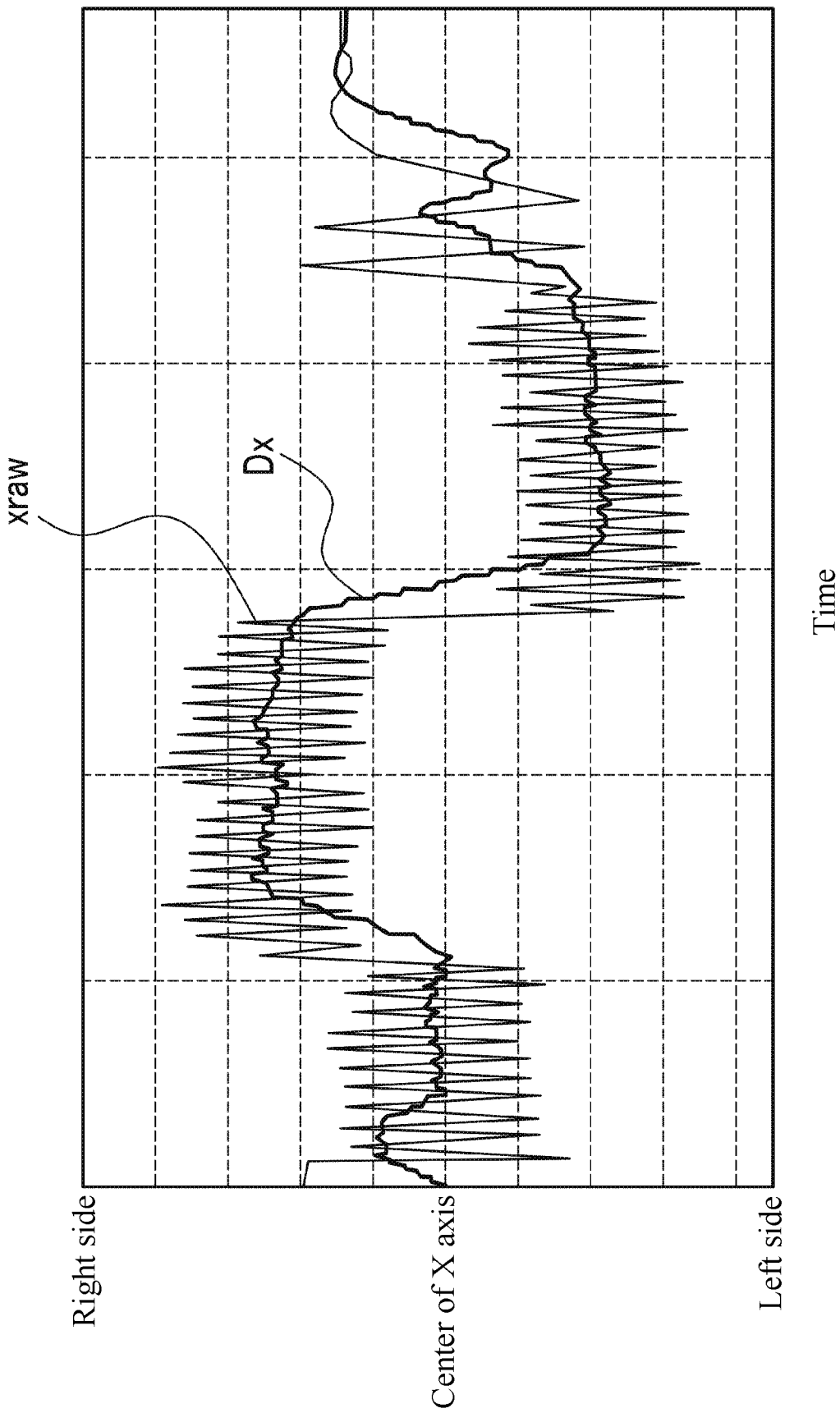

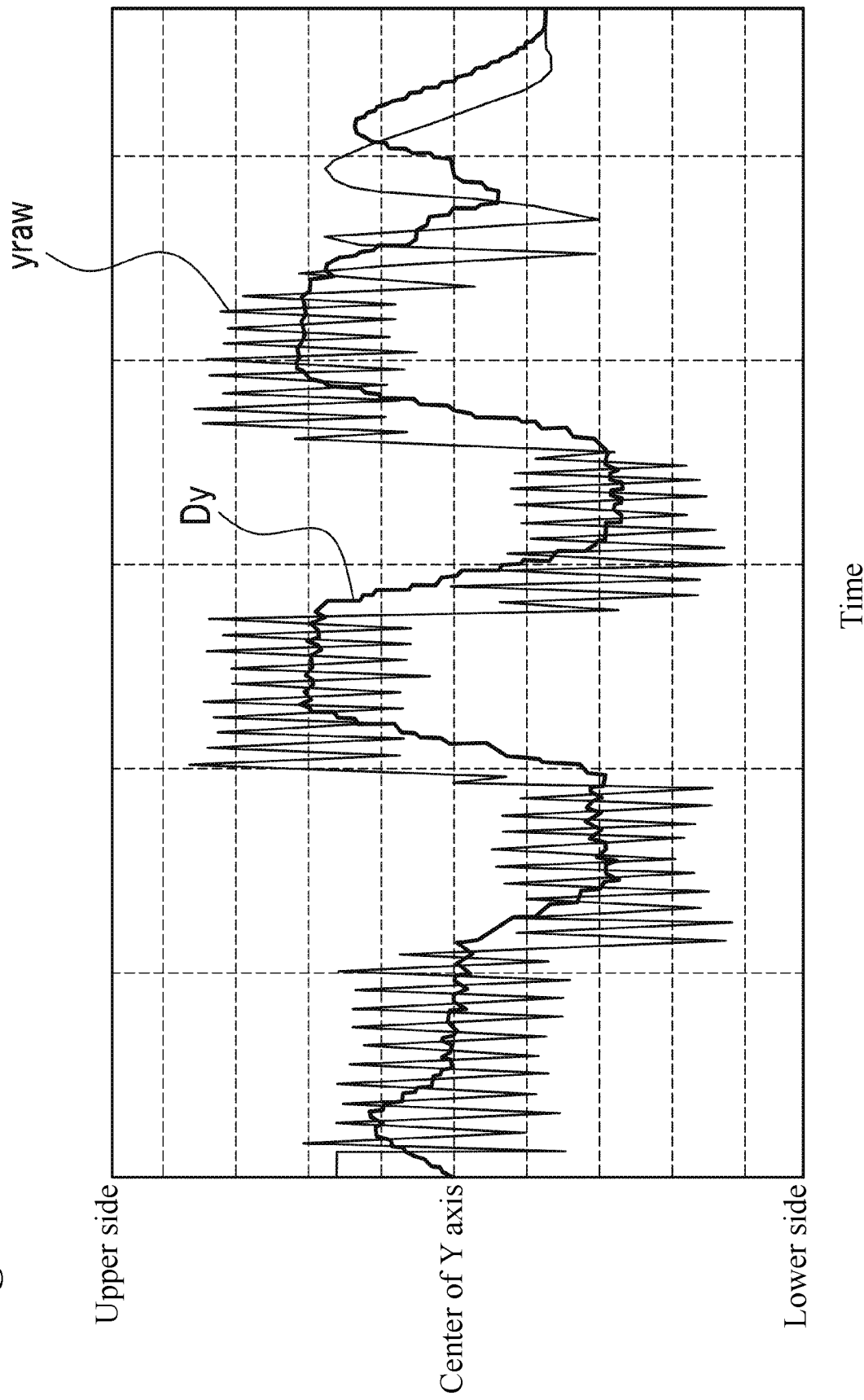

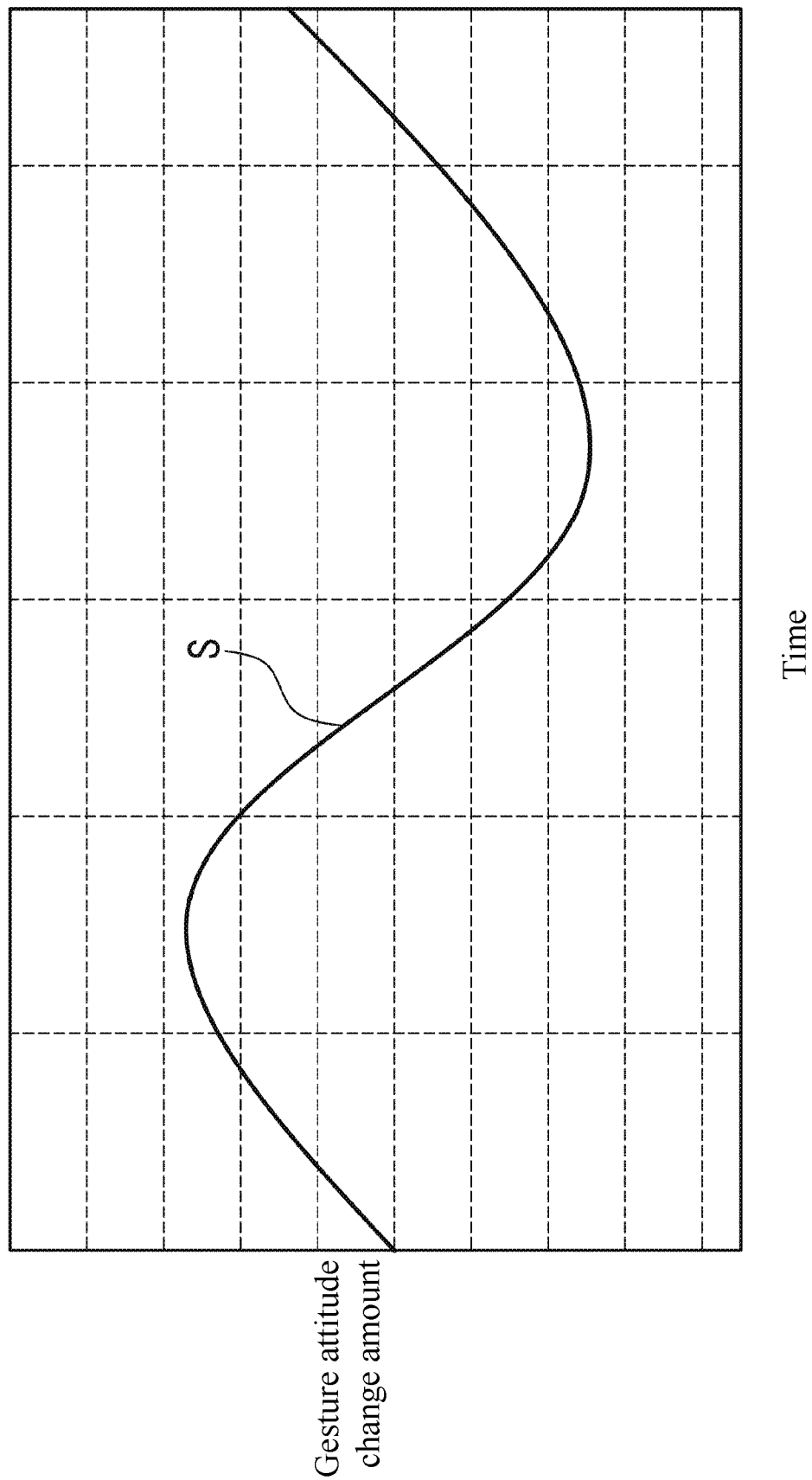

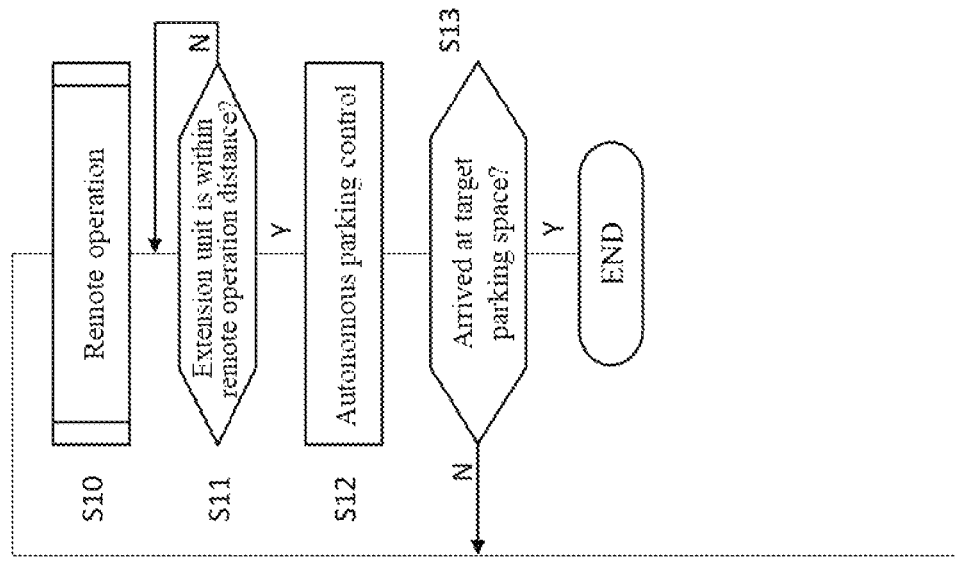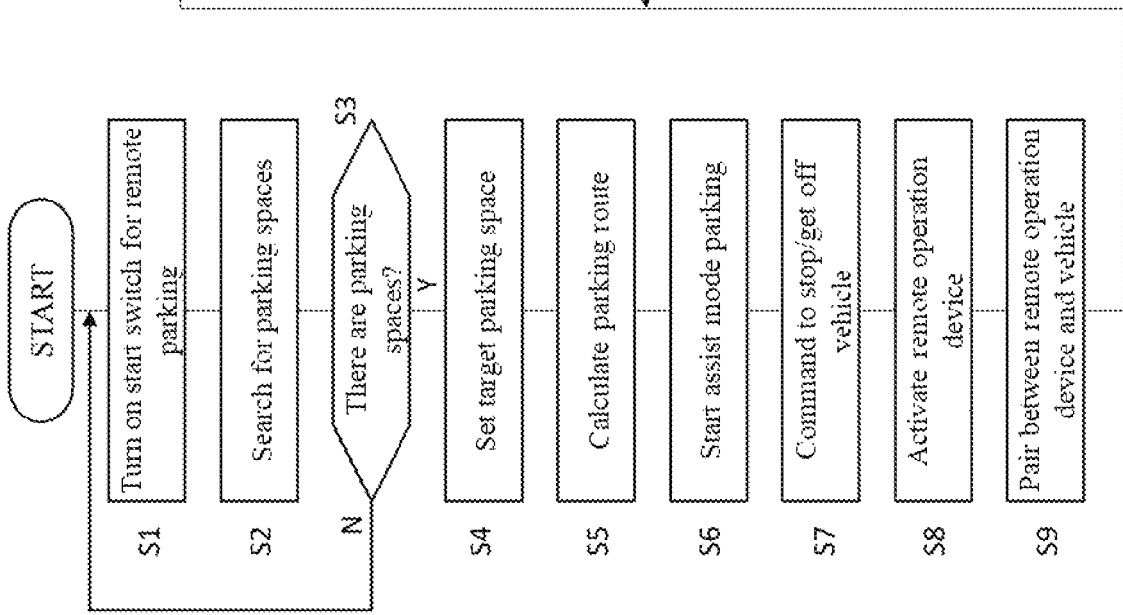
Fig. 9

VEHICLE REMOTE CONTROL METHOD AND VEHICLE REMOTE CONTROL DEVICE

TECHNICAL FIELD

The present invention relates to a vehicle remote control method and a vehicle remote control device that allow a vehicle having an autonomous travel control function to autonomously travel by remote operation.

BACKGROUND

A method for remote control of a vehicle is known (US2016/0170494A). In this method, a determination is made as to whether or not a gesture that is input to the touch panel of a remote operation device of the vehicle corresponds to a predefined gesture. When the input gesture corresponds to the predefined gesture, the vehicle is allowed to execute a predetermined function allocated to the gesture.

SUMMARY

In the above prior art, a determination cannot be made as to whether or not the gesture being input to the touch panel is actually input by the operator.

A problem to be solved by the present invention is to provide a vehicle remote control method and a vehicle remote control device that are able to determine whether or not a gesture is input by the operator.

In the present invention, when a vehicle having an autonomous travel control function is remotely operated by a remote operation device, detected coordinate information indicating a temporal transition in detected coordinates of a gesture detected by a touch panel of the remote operation device is acquired, and a change amount of a physical change occurring on the remote operation device is detected to acquire operation device transition information indicating a temporal transition in the change amount. Then, frequency characteristics of the detected coordinate information are compared with frequency characteristics of the operation device transition information to determine whether or not there is correlation, and when there is correlation, the vehicle is controlled to execute the autonomous travel control.

According to the present invention, when there is correlation between the frequency characteristics of the detected coordinate information and the frequency characteristics of the operation device transition information, a determination can be made that the physical change occurring on the remote operation device is caused by the input of the gesture to the touch panel. A determination can therefore be made as to whether or not the input gesture is input by the operator.

BRIEF DESCRIPTION OF THE DRAWINGS

FIG. 5 is an explanatory diagram illustrating a state in which an input guide for a gesture is displayed on a touch panel of FIG. 4;

FIG. 6A is a graph illustrating a detection value of a touch operation in the X-axis direction detected by the touch panel of FIG. 4 and detected coordinate information obtained from the detected value;

FIG. 6B is a graph illustrating a detection value of a touch operation in the Y-axis direction detected by the touch panel of FIG. 4 and detected coordinate information obtained from the detected value;

FIG. 7B is a graph illustrating an attitude change amount occurring on the remote operation device due to input of a gesture, which is extracted from the composite attitude change amount illustrated in FIG. 7A;

FIG. 9 is a flowchart illustrating an example of a control procedure executed in the remote parking system of FIG. 1;

DETAILED DESCRIPTION

First Embodiment

Figure 1:
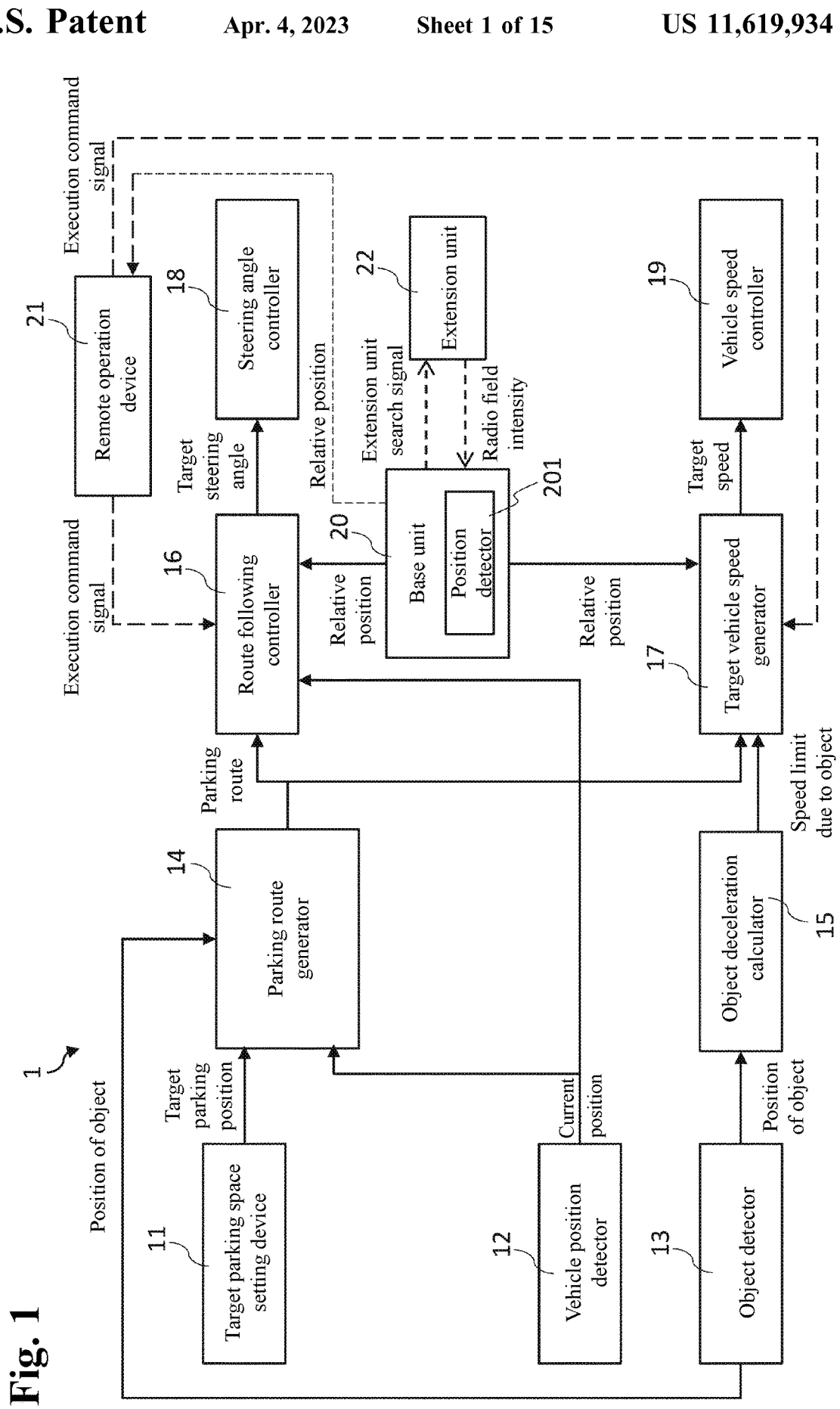
FIG. 1 is a block diagram illustrating a remote parking system to which the vehicle remote control method and vehicle remote control device of the present invention are applied.

Hereinafter, an embodiment of the present invention will be described with reference to the drawings. FIG. 1 is a block diagram illustrating a remote parking system 1 to which the vehicle remote control method and vehicle remote control device of the present invention are applied. In the present specification, "autonomous travel control" refers to controlling a vehicle to travel through automated or autonomous control executed by an onboard travel control device without relying on a driver's driving operation, while "autonomous parking control," which is one type of the autonomous travel control, refers to controlling a vehicle to park (enter or exit a parking space or a garage) through automated or autonomous control executed by an onboard travel control device without relying on a driver's driving operation. Also in the present specification, "parking" refers to a vehicle being continuously stopped in a parking space, and the term "travel route" encompasses not only a parking route in the case of entry into a parking space or a garage but also a route for exit from a parking space or a garage. In this sense, the "vehicle travel control method and vehicle travel control device used when parking" encompass both the travel control of a vehicle at the time of entry into a parking space or a garage and the travel control of a vehicle at the time of exit from a parking space or a garage. The entry into a parking space or a garage may be simply referred to as entry or entering, and the exit from a parking space or a garage may be simply referred to as exit or exiting.

In the following embodiments, specific examples of the present invention will be described with reference to an example in which the remote control method and remote control device according to the present invention are applied to a remote parking system in which a remote-controlled vehicle is parked by autonomous travel control. The remote parking system 1 of the present embodiment performs the autonomous travel control in an assist mode in which an operator such as a driver gets on a vehicle and an intervention operation performed by the operator is possible. After that, the operator gets off the vehicle and performs the autonomous travel control from outside the vehicle in a remote control mode using a remote operation device.

The remote parking system 1 according to the present embodiment is a system for performing the operation of entry into or exit from a parking space or a garage by the autonomous travel control when performing the operation. More specifically, the driver gets off the vehicle in mid-course of the entry into a parking space or a garage and continues to transmit an execution command signal from a remote operation device while confirming safety, and the vehicle thereby continues the autonomous parking control. When the vehicle may collide with an obstacle, the autonomous parking control is stopped by pausing transmission of the execution command signal from the remote operation device. In the following description, the autonomous travel control mode in which an operator such as a driver gets on the vehicle and can perform the intervention operation will be referred to as an assist mode, and the autonomous travel control mode in which the operator gets off the vehicle and performs the operation of entry into or exit from a parking space or a garage with the use of remote operation will be referred to as a remote control mode.

In a narrow parking space in which side doors cannot be fully opened, such as a narrow garage or a parking lot in which other vehicles are parked on both sides, for example, it may be difficult for the driver to get on or get off the vehicle. To enable the parking even in such a case, the remote control mode can be used together with the remote operation. When performing the entry into a parking space in the remote control mode, after the remote control mode is initiated to calculate the entry route into the selected parking space and start the autonomous parking control, the driver gets off the vehicle while carrying the remote operation device. The driver who has gotten out of the vehicle continues to transmit the execution command signal from the remote operation device to the vehicle to complete the entry into the selected parking space.

On the other hand, when performing the exit from the parking space, the driver turns on the internal combustion engine or drive motor of the vehicle using the remote operation device carried by the driver, and after the remote exit mode is initiated to calculate the exit route to a selected exit position and start the autonomous exit control, the driver continues to transmit the execution command signal from the remote operation device to complete the exit from the parking space and then gets on the vehicle. Thus, the remote parking system 1 of the present embodiment is a system having such a remote control mode with the use of the remote operation. An example of the autonomous parking control will be exemplified as autonomous reverse parking control illustrated in FIG. 2, but the present invention can also be applied to the exit from a parking space or a garage, autonomous parallel parking, and other autonomous parking.

The remote parking system 1 of the present embodiment includes a target parking space setting device 11, a vehicle position detector 12, an object detector 13, a parking route generator 14, an object deceleration calculator 15, a route following controller 16, a target vehicle speed generator 17, a steering angle controller 18, a vehicle speed controller 19, a base unit 20, a remote operation device 21, and an extension unit 22. The target parking space setting device 11, vehicle position detector 12, object detector 13, parking route generator 14, object deceleration calculator 15, route following controller 16, target vehicle speed generator 17, steering angle controller 18, vehicle speed controller 19, and base unit 20 are equipped in the vehicle. The remote operation device 21 and extension unit 22 are carried by an operator such as a driver. Each configuration will be described below.

In the remote control mode, the target parking space setting device 11 searches for parking spaces existing around the subject vehicle and allows the operator to select a desired parking space from among available parking spaces. In addition, the target parking space setting device 11 outputs positional information of the selected parking space (such as the coordinates of a relative position from the current position of the subject vehicle and the latitude/longitude) to the parking route generator 14.

To achieve the above-described functions, the target parking space setting device 11 includes an input switch, a plurality of cameras, a parking space detector, and a touch panel-type display (none of which are illustrated). The input switch selectively selects the remote control mode or the assist mode. The plurality of cameras captures images around the vehicle. The cameras of the target parking space setting device 11 may also be used as one or more cameras of the object detector 13, which will be described later. The parking space detector is a computer that is installed with a software program for searching for available parking spaces from the image data captured by the cameras. The touch panel-type display is used for display of the detected parking spaces and selection of a parking space.

When an operator such as a driver selects the remote control mode using the input switch, the target parking space setting device 11 uses the plurality of cameras to acquire the image data around the subject vehicle and analyzes the image data to detect available parking spaces. In addition, the target parking space setting device 11 displays an image including the available parking spaces on the touch panel-type display and prompts the operator to select a parking space in which the operator wants to park the vehicle. When the operator selects a desired parking space from among the displayed parking spaces, the target parking space setting device 11 outputs the positional information of that parking space to the parking route generator 14. Upon search for the available parking spaces, when the map information stored in a navigation device includes parking lot information having detailed positional information, the parking lot information may be used.

The vehicle position detector 12 is composed of a GPS unit, a gyro sensor, a vehicle speed sensor, and other components. The GPS unit detects radio waves transmitted from a plurality of satellite communications and periodically acquires positional information of the subject vehicle. The vehicle position detector 12 detects the current position of the subject vehicle based on the positional information of the subject vehicle acquired by the GPS unit, the angle change information acquired from the gyro sensor, and the vehicle speed acquired from the vehicle speed sensor. The positional information of the subject vehicle detected by the vehicle position detector 12 is output to the parking route generator 14 and the route following controller 16 at predetermined time intervals.

The object detector 13 is configured to search for whether or not an object such as an obstacle is present around the subject vehicle. The object detector 13 includes one or more cameras, radar (such as millimeter-wave radar, laser radar, or ultrasonic radar), sonar, or the like or a combination thereof. The cameras, radar, sonar, or the like or a combination thereof is attached to an outer panel part of the subject vehicle. The position to which the object detector 13 is attached is not particularly limited. One or more object detectors 13 can be attached, for example, to all or part of sites of the center and both sides of the front bumper, the center and both sides of the rear bumper, the sill outers below the right and left center pillars, and the like.

Each object detector 13 further includes a computer that is installed with a software program for specifying the position of an object detected by the cameras, radar, or the like. This computer outputs the specified object information (target object information) and its positional information (such as the coordinates of a relative position from the current position of the subject vehicle and the latitude/longitude) to the parking route generator 14 and the object deceleration calculator 15. Before the start of the autonomous parking control, the specified object information and its positional information are used by the parking route generator 14 to generate a parking route. When an object such as an abrupt obstacle is detected during the autonomous parking control, the object deceleration calculator 15 uses the object information and its positional information for control of decelerating or stopping the subject vehicle. During the autonomous parking control, the object information and its positional information are used by the object deceleration calculator 15 for control of decelerating or stopping the subject vehicle when an object such as an abrupt obstacle is detected.

The parking route generator 14 calculates a parking route from the current position of the subject vehicle to the target parking position (the parking route refers to the entry route in the case of the remote control mode, here and hereinafter). The parking route is calculated so as not to collide or interfere with an object. Calculation of the parking route includes using the size of the subject vehicle (such as a vehicle width, a vehicle length, or a minimum turning radius) which is preliminarily stored, the target parking position (which refers to the positional information of the parking space in the case of the remote control mode, here and hereinafter) from the target parking space setting device 11, the current positional information of the subject vehicle from the vehicle position detector 12, and the positional information of an object (obstacle) from the object detector 13.

Figure 2:
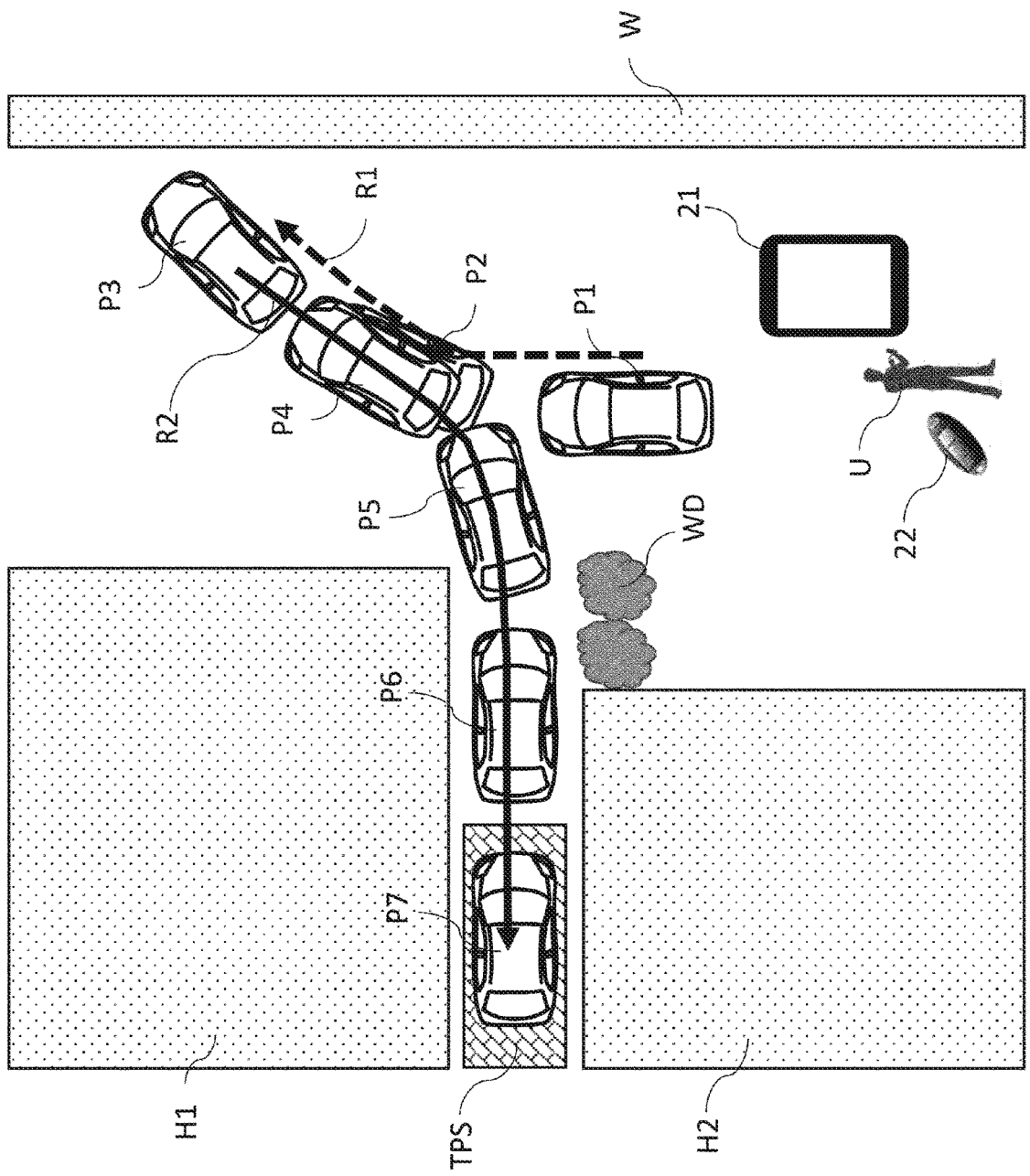
FIG. 2 is a plan view illustrating an example of remote reverse parking executed in the remote parking system of FIG. 1.

FIG. 2 is a plan view illustrating an example of the remote control mode. At a current position P1 of a subject vehicle V illustrated in FIG. 2, when an operator U such as the driver operates the input switch inside the vehicle to select the remote control mode, the target parking space setting device 11 searches for available parking spaces TPSs and displays an image including the parking spaces TPSs on a display. In response to this, when the operator U selects a parking space TPS, the parking route generator 14 calculates a parking route R1 from the current position P1 to a position of turn for parking P3 via a position P2 and a parking route R2 from the position of turn for parking P3 to a position P7 in the parking space TPS which is the target via an intermediate stop position P4 and positions P5 and P6. Then, the parking route generator 14 outputs this series of the parking routes R1 and R2 to the route following controller 16 and the target vehicle speed generator 17.

The object deceleration calculator 15 receives the positional information of obstacles and other objects from the object detector 13 and calculates the time for the subject vehicle to collide with an object (TTC: Time to Collision) based on the distance from the object and the vehicle speed, thus calculating the deceleration start timing of the subject vehicle. For example, in the remote control mode illustrated in FIG. 2, objects as obstacles include a wall W on the right side of the road at the position of turn for parking P3, houses H1 and H2 on both the right and left sides of the parking route R2 to the target parking space TPS, and garden trees WD. When the distance from such an obstacle is a predetermined value or more, the object deceleration calculator 15 sets the vehicle speed to an initial set value and decelerates the vehicle speed of the subject vehicle V at the timing when the time TTC for the subject vehicle V to collide with the obstacle becomes a predetermined value or less. Likewise, when an abrupt obstacle is detected on the parking route R1 or R2 during execution of the sequential autonomous parking control illustrated in FIG. 2, the subject vehicle V is decelerated or stopped at the timing when the time TTC for the subject vehicle V to collide with the obstacle becomes a predetermined value or less. This deceleration start timing is output to the target vehicle speed generator 17.

The route following controller 16 calculates, at predetermined time intervals, a target steering angle for the subject vehicle to follow the parking routes based on the parking routes from the parking route generator 14 and the current position of the subject vehicle from the vehicle position detector 12. As for the parking routes R1 and R2 of FIG. 2, the route following controller 16 calculates, at a predetermined time interval for each current position of the subject vehicle V, the target steering angle along the parking route R1 for traveling straight ahead and turning right from the current position P1 to the position of turn for parking P3. Likewise, the route following controller 16 calculates, at a predetermined time interval for each current position of the subject vehicle V, the target steering angle along the parking route R2 for turning left and traveling straight ahead from the position of turn for parking P3 to the parking space TPS. The route following controller 16 outputs the calculated target steering angles to the steering angle controller 18.

The target vehicle speed generator 17 calculates, at predetermined time intervals, a target vehicle speed for the subject vehicle V to follow the parking routes based on the parking routes from the parking route generator 14 and the deceleration start timing from the object deceleration calculator 15. As for the entry routes R1 and R2 of FIG. 2, the target vehicle speed generator 17 calculates, at a predetermined time interval for each current position of the subject vehicle V, the target vehicle speed when starting from the current position P1, traveling straight ahead and turning right, and stopping at the position of turn for parking P3 and outputs the calculated target vehicle speed to the vehicle speed controller 19. Likewise, the target vehicle speed generator 17 calculates, at a predetermined time interval for each current position of the subject vehicle V, the target vehicle speed when starting again (moving backward) from the position of turn for parking P3 and turning left on the way to the target parking space TPS and the target vehicle speed when approaching the target parking space TPS and stopping there and outputs the calculated target vehicle speeds to the vehicle speed controller 19. When an abrupt obstacle is detected on the parking route R1 or R2 during execution of the sequential autonomous parking control illustrated in FIG. 2, the timing of deceleration or stopping is output from the object deceleration calculator 15, and the target vehicle speed is therefore output to the vehicle speed controller 19 in accordance with that timing.

The steering angle controller 18 generates a control signal for operating a steering actuator provided in the steering system of the subject vehicle V based on the target steering angle from the route following controller 16. The vehicle speed controller 19 also generates a control signal for operating an accelerator actuator provided in the drive system of the subject vehicle V based on the target vehicle speed from the target vehicle speed generator 17. The steering angle controller 18 and the vehicle speed controller 19 are concurrently controlled thereby to execute the autonomous parking control.

The extension unit 22 and the base unit 20 will then be described. The international standard for autonomous travel control of a vehicle defines a condition for permitting the remote operation of a vehicle, in which the distance between the vehicle and the operator is within a predetermined remote operation distance (e.g., within 6 m). In the remote parking system 1 of the present embodiment, therefore, the extension unit 22 carried by the operator U and the base unit 20 equipped in the subject vehicle V are used to detect the relative position of the extension unit 22 with respect to the subject vehicle V, that is, the relative position of the operator U, who carries the extension unit 22, with respect to the subject vehicle V. The extension unit 22 and the base unit 20 constitute a so-called keyless entry system. The keyless entry system is a system configured such that when the operator U such as the driver approaches the subject vehicle V within a predetermined distance in a state of carrying the extension unit 22, wireless communication is established between the base unit 20 equipped in the subject vehicle V and the extension unit 22 to perform automated unlocking of the door lock or the like.

Figure 3:
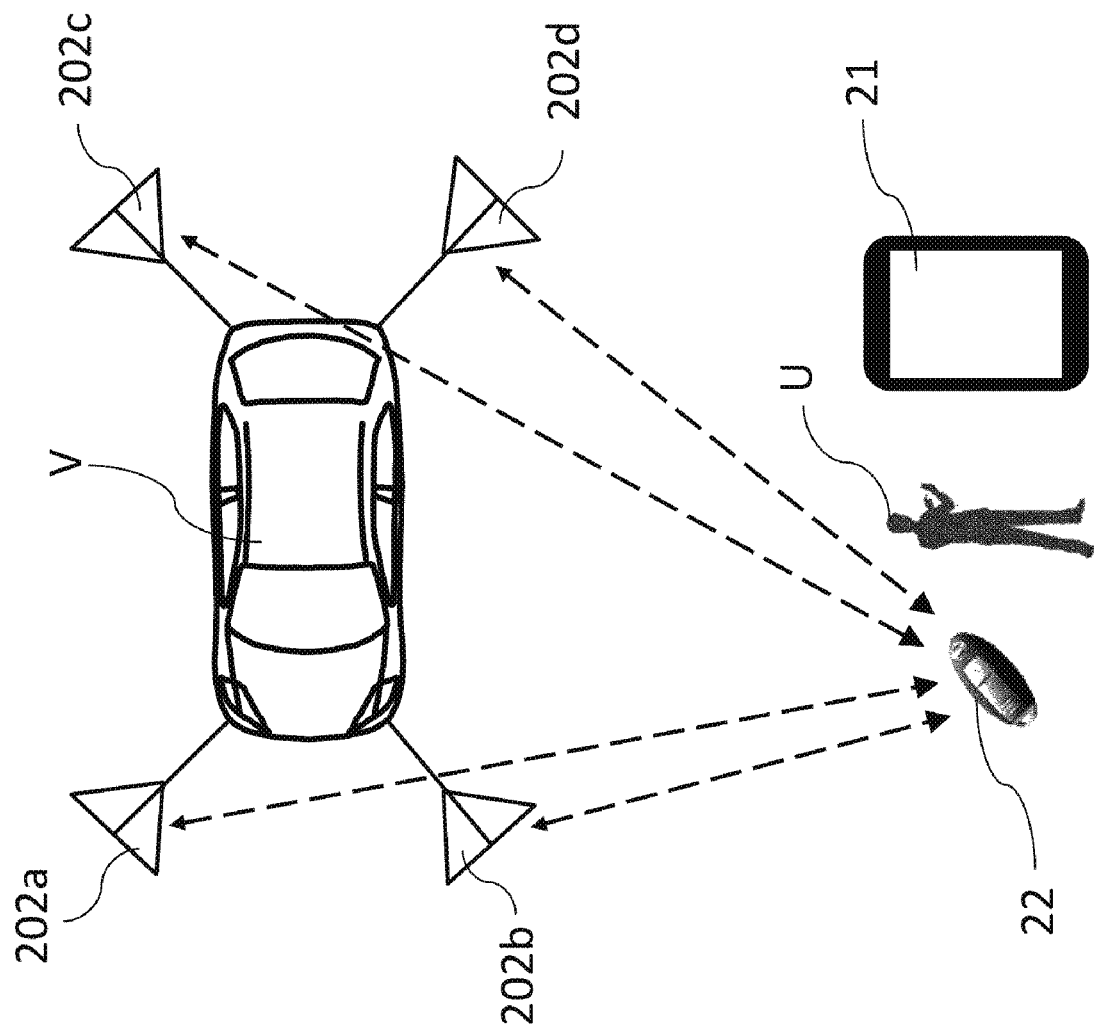
FIG. 3 is an explanatory diagram illustrating a state of detecting the relative position of an extension unit of FIG. 1 with respect to a subject vehicle.

In the present embodiment, as illustrated in FIG. 3, for example, antennas 202a to 202d connected to the base unit 20 are installed at predetermined sites of the subject vehicle V. The base unit 20 transmits extension unit search signals from the antennas 202a to 202d. When approaching the subject vehicle V within a predetermined distance, the extension unit 22 receives the extension unit search signals transmitted from the antennas 202a to 202d and measures the radio field intensity of the extension unit search signal from each of the antennas 202a to 202d. The radio field intensity of the extension unit search signal varies depending on the distance between the extension unit 22 and each of the antennas 202a to 202d. That is, when the extension unit 22 is present near the antenna 202b in the vicinity of the left side of the front bumper, the radio field intensity of the extension unit search signal received from the antenna 202b is the strongest, while the radio field intensity of the extension unit search signal received from the antenna 202c in the vicinity of the right side of the rear bumper is the weakest.

The extension unit 22 transmits the measured radio field intensity of the extension unit search signal from each of the antennas 202a to 202d to the base unit 20. The base unit 20 has a position detector 201 that is, for example, a computer installed with a software program for calculating the position of the extension unit 22 from the radio field intensities of the antennas 202a to 202d received from the extension unit 22, such as by using a triangulation method. On the basis of the radio field intensities of the antennas 202a to 202d received from the extension unit 22, the position detector 201 detects the relative position of the extension unit 22 with respect to the subject vehicle V, that is, the relative position of the operator U, who carries the extension unit 22, with respect to the subject vehicle V. The position detector 201 outputs the detected relative position of the extension unit 22 to the route following controller 16 and the target vehicle speed generator 17 (these may alternatively be the steering angle controller 18 and the vehicle speed controller 19) and transmits the detected relative position of the extension unit 22 to the remote operation device 21.

The remote operation device 21 is a device for the operator U to command from outside the vehicle as to whether to continue or stop the execution of the autonomous parking control which is set by the target parking space setting device 11. The remote operation device 21 therefore has a wireless communication function for transmitting the execution command signal to the route following controller 16 and the target vehicle speed generator 17 (these may alternatively be the steering angle controller 18 and the vehicle speed controller 19) and performs communication with a wireless communication function of the subject vehicle V.

The international standard for autonomous travel control of a vehicle defines that the vehicle is allowed to execute the autonomous travel control only while the operator continuously operates the remote operation device. In the remote parking system 1 of the present embodiment, therefore, the execution command signal is continued to be transmitted from the remote operation device 21 to the subject vehicle V only while a predetermined gesture is continuously input on the touch panel of the remote operation device 21. In addition, the subject vehicle V executes the autonomous parking control only while receiving the execution command signal transmitted from the remote operation device 21. That is, when the gesture becomes not detected by the remote operation device 21 and the execution command signal becomes not transmitted, the execution of the autonomous parking control is suspended or stopped.

The remote operation device 21 is provided, for example, as a mobile information terminal such as a smartphone installed with application software for remote control (referred to as an application, hereinafter). The smartphone installed with the application serves as the remote operation device 21 of the remote parking system 1 by activating the application.

Mobile information terminals such as smartphones include those equipped with an operation automation function as standard and those which can obtain such an operation automation function by installing application software. The operation automation function is used for recording and repeatedly regenerating a touch operation on the touch panel 211. As described above, a mobile information terminal such as a smartphone is used as the remote operation device 21, and the autonomous parking control of the subject vehicle V may therefore be executed by inputting a gesture using the operation automation function even through the operator does not actually input a gesture. In particular, when, in order to extend the remote operation distance of the subject vehicle V, the operator U places the extension unit 22 in the vicinity of the subject vehicle V or on the roof of the subject vehicle V and operates the operation automation function of the remote operation device 21 to input a gesture without carrying the extension unit 22, the subject vehicle V will perform the autonomous parking control at a position away from the operator U without the operation of the operator U. In the remote parking system 1 of the present embodiment, to suppress the input of a gesture using the operation automation function, a determination is made as to whether or not the gesture being input to the remote operation device 21 is input by the touch operation of the operator U. Then, when the gesture is not input by the touch operation of the operator U, the execution of the autonomous parking control of the subject vehicle V is suspended or prohibited.

Figure 4:
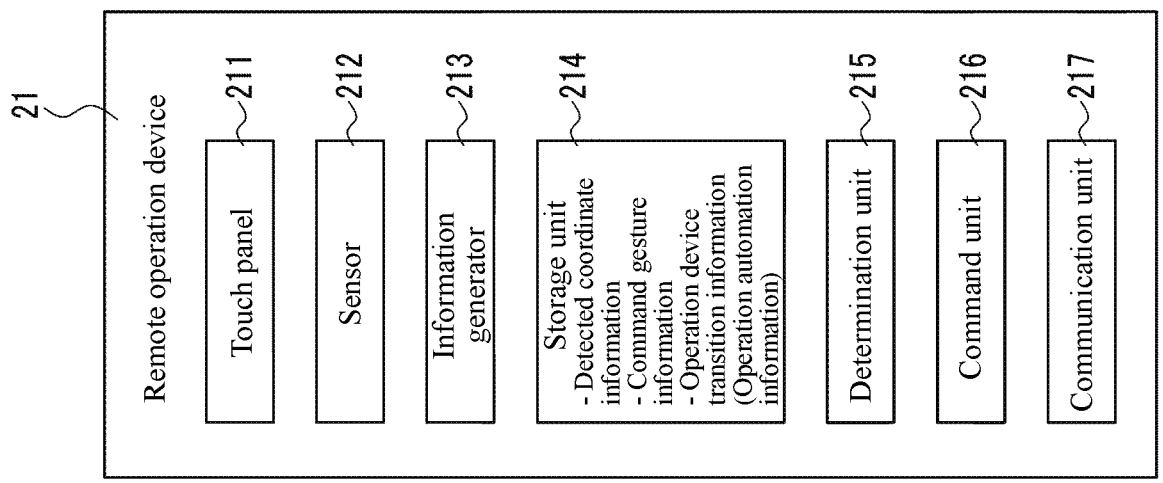
FIG. 4 is a block diagram illustrating the configuration of a remote operation device of FIG. 1.

As illustrated in FIG. 4, the remote operation device 21 includes a touch panel 211, a sensor 212, an information generator 213, a storage unit 214, a determination unit 215, a command unit 216, and a communication unit 217. The touch panel 211 detects a gesture that is input by the touch operation of the operator U. The sensor 212 detects the change amount of a physical change that occurs on the remote operation device 21. The information generator 213 generates detected coordinate information based on the detected coordinates of the gesture detected by the touch panel 211. The information generator 213 also generates operation device transition information that indicates a temporal transition in the change amount (set or profile of transitions in the change amount with respect to the time axis direction) of the physical change of the remote operation device 21. The storage unit 214 stores the detected coordinate information, command gesture information related to a preliminarily set command gesture, and the operation device transition information. The determination unit 215 compares the detected coordinate information with the command gesture information to determine whether or not the gesture detected by the touch panel 211 is the command gesture. The determination unit 215 also compares frequency characteristics of the detected coordinate information with frequency characteristics of the operation device transition information to determine whether or not there is correlation. The command unit 216 generates the execution command signal when the detected gesture is the command gesture and there is correlation between the frequency characteristics of the detected coordinate information and the frequency characteristics of the operation device transition information. The communication unit 217 transmits the execution command signal generated by the command unit 216 to the subject vehicle V.

Each part of the remote operation device 21 will be described below in more detail. The touch panel display of a smartphone that serves as the remote operation device 21 is used as the touch panel 211. In the remote control mode, the touch panel 211 detects a gesture that is input by the touch operation of the operator U. The gesture to be input on the touch panel 211 is a specified command gesture that is preliminarily set. In the present embodiment, a circular-shaped figure is set as the specified command gesture. The circular-shaped figure is closed so that a starting end at which one input of the gesture is started and a terminating end at which the one input of the gesture is terminated overlap each other. As illustrated in FIG. 5, on the touch panel 211 when the input of a gesture is started, an input guide 212a that indicates the shape of the command gesture having a specified size is displayed. In the vicinity of the input guide 212a, a message such as "Please make a touch operation on the displayed input guide along the arrow direction" is displayed. The input guide 211a may be hidden after the input gesture is determined to be the command gesture.

The sensor 212 is a so-called motion sensor, such as an acceleration sensor, a gyro sensor, or an orientation sensor, which is preliminarily provided in a mobile information terminal that serves as the remote operation device 21. The acceleration sensor, gyro sensor, and orientation sensor are known sensors, so the detailed description will be omitted. In the present embodiment, the change amount of a change in the attitude of the remote operation device 21 is detected as the change amount of a physical change that occurs on the remote operation device 21. For example, when inputting a gesture to the remote operation device 21, the operator U holds the remote operation device 21 with one hand and inputs the gesture with the other hand or holds the remote operation device 21 with one hand and inputs the gesture with the thumb on the holding side. Thus, when the operator U holds the remote operation device 21 to input a gesture, a change in the attitude of the remote operation device 21 occurs due to the input of the gesture. The sensor 212 detects the change amount of a change in the attitude of the remote operation device 21 when the vehicle V is remotely controlled using the remote operation device 21.

As the central processing unit (CPU) of a mobile information terminal that serves as the remote operation device 21 operates in accordance with the application, the information generator 213 functions. The graphs illustrated in FIGS. 6A and 6B each illustrate an example of the detection value of the touch operation detected by the touch panel 211 when the operator U inputs a gesture on the touch panel 211. In the graph of FIG. 6A, the horizontal axis represents time and the vertical axis represents a detected value xraw of the touch operation in the X-axis direction. The positive side of the vertical axis in the graph of FIG. 6A indicates the right side of the center line on the X axis of the touch panel 211 while the negative side indicates the left side of the center line on the X axis. Likewise, in the graph of FIG. 6B, the horizontal axis represents time and the vertical axis represents a detected value yraw of the touch operation in the Y-axis direction. The positive side of the vertical axis in the graph of FIG. 6B indicates the upper side of the center line on the Y axis of the touch panel 211 while the negative side indicates the lower side of the center line on the Y axis. That is, the detected values xraw and yraw indicate the detected coordinates of the touch operation detected by the touch panel 211. The information generator 213 calculates the moving average values of the detected values xraw and yraw, which are output from the touch panel 211, and stores the calculated moving average values in the storage unit 214 as detected coordinate information Dx and Dy that indicate temporal transitions in the detected coordinates (sets or profiles of transitions in the detected coordinates with respect to the time axis direction).

Figure 7A:
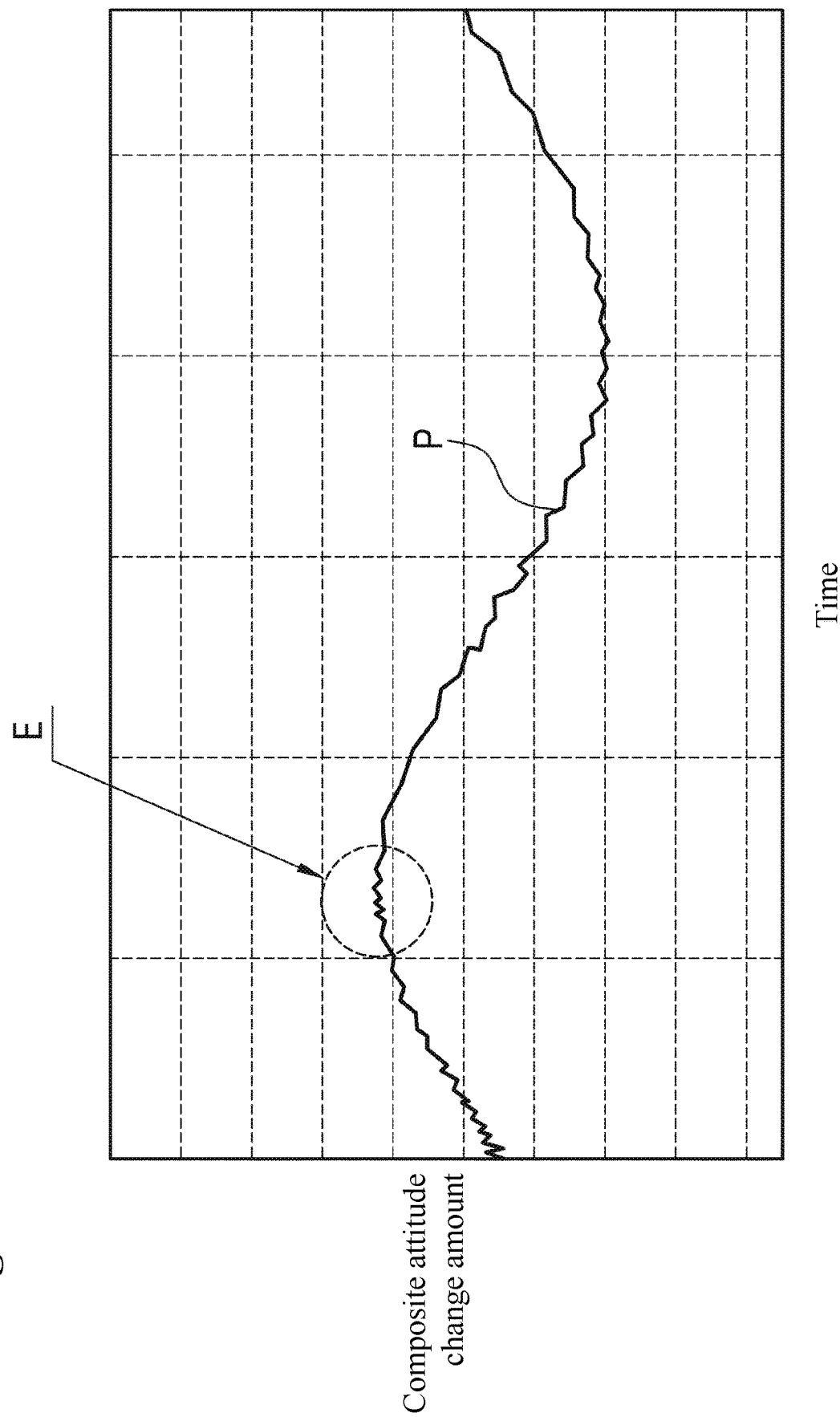
FIG. 7A is a graph illustrating a composite attitude change amount of the remote operation device detected by the sensor of FIG. 4.

The information generator 213 also generates operation device transition information that indicates the temporal transition in the change amount of the attitude of the remote operation device 21 detected by the acceleration sensor, gyro sensor, and orientation sensor of the sensor 212. In the graph illustrated in FIG. 7A, the horizontal axis represents time and the vertical axis represents the attitude change amount and change direction of the remote operation device 21 detected by the sensor 212. When the operator U inputs a gesture in a state of holding the remote operation device 21, the remote operation device 21 causes not only an attitude change due to the input of a gesture but also an attitude change due to other various factors. For example, the operator U may move the remote operation device 21 up/down and/or right/left while inputting a gesture on the touch panel 211. In addition, when the operator U inputs a gesture while walking, an attitude change due to the walking vibration also occurs. The graph illustrated in FIG. 7A represents a composite attitude change amount P that occurs on the remote operation device 21 due to such various factors.

The information generator 213 extracts, from the composite attitude change amount detected by the sensor 212, an attitude change amount caused due to the input of a gesture to the touch panel 211 (refers to as a gesture attitude change amount, hereinafter) and stores the extracted gesture attitude change amount in the storage unit 214 as the operation device transition information. For example, in the example illustrated in FIG. 7A, the information generator 213 extracts, from the composite attitude change amount P, a portion having frequency characteristics close to the frequency characteristics of the above-described detected coordinate information Dx and Dy, for example, the attitude change amount denoted by a reference character E of FIG. 7A, as the gesture attitude change amount. Then, as illustrated in FIG. 7B, the extracted gesture attitude change amount is stored in the storage unit 214 as operation device transition information S.

The scheme of extracting the gesture attitude change amount from the composite attitude change amount is not limited to the above scheme. For example, another scheme may include decomposing the composite attitude change amount into a plurality of attitude change amounts in accordance with the frequency characteristics, selecting an attitude change amount having frequency characteristics close to the frequency characteristics of the detected coordinate information Dx and Dy from among the plurality of decomposed attitude change amounts, and adopting the selected attitude change amount as the operation device transition information. Still another scheme may include preliminarily storing an average attitude change amount of the remote operation device 21 caused due to the input of a gesture in the storage unit 214 as a sample and extracting the gesture attitude change amount from the composite attitude change amount based on the sample.

The storage unit 214 is a storage such as a memory which is preliminarily provided in a mobile information terminal that serves as the remote operation device 21. The storage unit 214 stores the above-described detected coordinate information Dx and Dy and operation device transition information S. The storage unit 214 also stores the command gesture information regarding the form, size, etc. of the command gesture which are preliminarily set. Furthermore, operation automation information indicating the content of the touch operation recorded using the operation automation function is stored in the storage which constitutes the storage unit 214. The operation automation information corresponds to the detected coordinate information because it is information indicating the temporal transition in the input coordinates of a gesture detected by the touch panel 211 of the remote operation device 21 at the time of recording the touch operation using the operation automation function.

As the CPU of a smartphone that serves as the remote operation device 21 operates in accordance with the application, the determination unit 215 functions. The determination unit 215 acquires from the storage unit 214 the detected coordinate information indicating the temporal transition in the detected coordinates of a gesture detected by the touch panel 211. That is, when the operator U inputs a gesture on the touch panel 211, the determination unit 215 acquires the detected coordinate information Dx and Dy generated by the information generator 213, and when a gesture is input using the operation automation function, the determination unit 215 acquires the operation automation information as the detected coordinate information.

The determination unit 215 compares the acquired detected coordinate information Dx and Dy with the command gesture information to determine whether the gesture detected by the touch panel 211 is the command gesture and whether the input speed of the gesture is within a predetermined range. The reason why the input speed of the gesture is used for determining the command gesture is to distinguish a gesture that is input due to some object touching the touch panel 211 from the gesture of the operator U. Additionally or alternatively, when the determination unit 215 acquires the operation automation information as the detected coordinate information, the operation automation information and the command gesture information are compared with each other.

Figure 8:
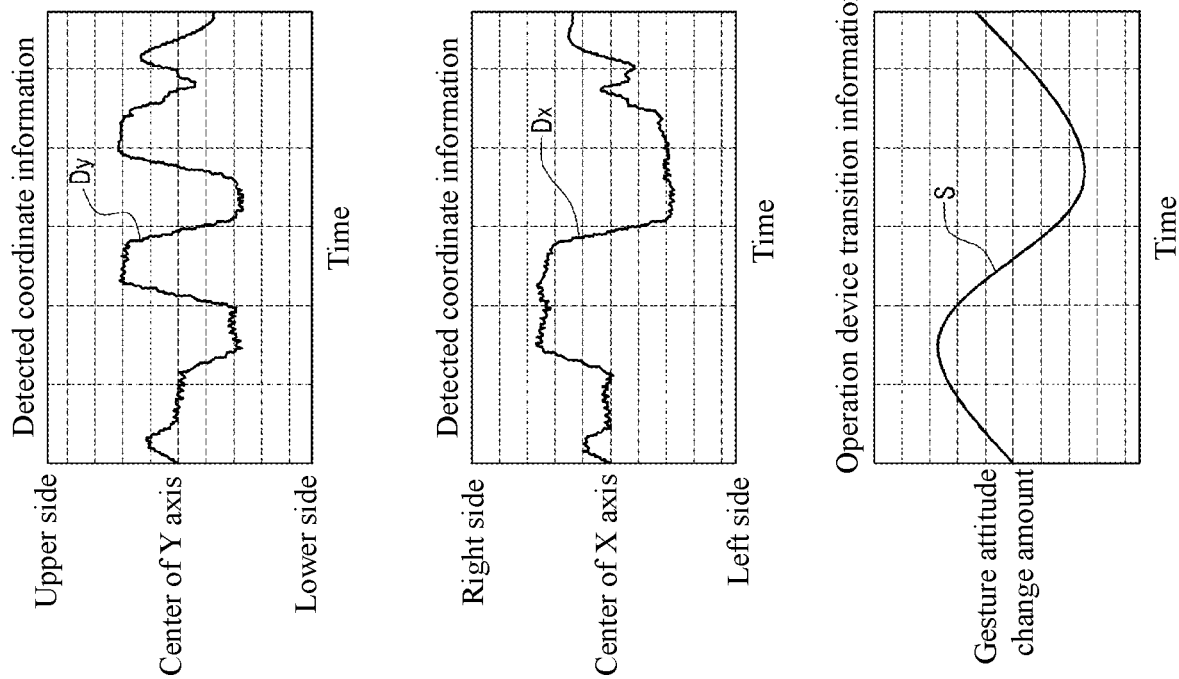
FIG. 8 is a set of diagrams for comparison between the detected coordinate information illustrated in FIGS. 6A and 6B and the attitude change amount occurring on the remote operation device due to input of a gesture illustrated in FIG. 7B.

In order to determine whether or not the gesture being input to the remote operation device 21 is input by the touch operation of the operator U, the determination unit 215 compares the frequency characteristics of the detected coordinate information Dx and Dy with the frequency characteristics of the operation device transition information S to determine whether or not there is correlation. For example, FIG. 8 is a set of diagrams for comparison between the above described detected coordinate information Dx and Dy and the operation device transition information S. As found from these diagrams, the detected coordinate information Dx and the operation device transition information S coincide with each other at least in the frequency characteristics such as a period and a wavelength. The determination unit 215 therefore determines that the detected coordinate information Dx and the operation device transition information S have correlation. Thus, when the frequency characteristics of the detected coordinate information Dx and the frequency characteristics of the operation device transition information S have correlation, a determination can be made that the gesture is input on the touch panel 211 in a state in which the remote operation device 21 is held by the operator U.

On the other hand, when the input of a gesture is performed with the remote operation device 21 using the operation automation function, the determination unit 215 acquires the operation automation information as the detected coordinate information from the storage unit 214. When a gesture is input using the operation automation function, an attitude change caused due to the input of a gesture does not occur on the remote operation device 21, so that the operation device transition information generated by the information generator 213 does not include an attitude change amount caused due to the input of a gesture. Therefore, even when the determination unit 215 compares the frequency characteristics of the operation automation information with the frequency characteristics of the operation device transition information, no correlation is recognized. Thus, a determination is made that a gesture is not input by the operator U, and the execution command signal is not transmitted to the subject vehicle V; therefore, the input of a gesture using the operation automation function can be suppressed.

The command unit 216 and communication unit 217 of the remote operation device 21 will then be described. As the CPU of a smartphone that serves as the remote operation device 21 operates in accordance with the application, the command unit 216 functions. When the operation determination unit 215 determines that the gesture detected on the touch panel 211 is the command gesture and that the gesture is input by the operator U, the command unit 216 generates the execution command signal for controlling the subject vehicle V to execute the autonomous parking control using the autonomous travel control function. The command unit 216 inputs the generated execution command signal to the communication unit 217.

The communication unit 217 uses the communication function which is preliminarily provided in a smartphone that serves as the remote operation device 21. The communication unit 217 is, for example, a wireless communication unit such as that for the Bluetooth (registered trademark) and, in the remote control mode, is connected to a wireless communication unit (not illustrated) equipped in the subject vehicle V. The communication unit 217 transmits the execution command signal generated by the command unit 216 to the subject vehicle V. A wireless local area network (LAN) such as Wi-Fi (registered trademark), a mobile phone line, or the like may also be used as the communication unit 217.

As illustrated in FIG. 1, the execution command signal transmitted to the subject vehicle V is input to the route following controller 16 and the target vehicle speed generator 17. As described above, the relative position between the subject vehicle V and the extension unit 22 is input from the position detector 201 to the route following controller 16 and the target vehicle speed generator 17. When the distance between the subject vehicle V and the extension unit 22 is within the remote operation distance and the execution command signal from the remote operation device 21 is input, the route following controller 16 outputs the target steering angle to the steering angle controller 18. Likewise, when the distance between the subject vehicle V and the extension unit 22 is within the remote operation distance and the execution command signal from the remote operation device 21 is input, the target vehicle speed generator 17 outputs the target vehicle speed to the vehicle speed controller 19. On the basis of the target steering angle from the route following controller 16, the steering angle controller 18 generates a control signal for operating the steering actuator provided in the steering system of the subject vehicle. On the basis of the target vehicle speed from the target vehicle speed generator 17, the vehicle speed controller 19 generates a control signal for operating the accelerator actuator provided in the drive system of the subject vehicle V.

In the case in which the distance between the subject vehicle V and the extension unit 22 is longer than the remote operation distance, the route following controller 16 does not output the target steering angle to the steering angle controller 18 even when the execution command signal from the remote operation device 21 is input. Likewise, in the case in which the distance between the subject vehicle V and the extension unit 22 is longer than the remote operation distance, the target vehicle speed generator 17 does not output the target vehicle speed to the vehicle speed controller 19 even when the execution command signal from the remote operation device 21 is input. That is, in the case in which the distance between the subject vehicle V and the extension unit 22 is longer than the remote operation distance, the autonomous parking control is not executed even when the command gesture is input from the remote operation device 21.

Figure 10:
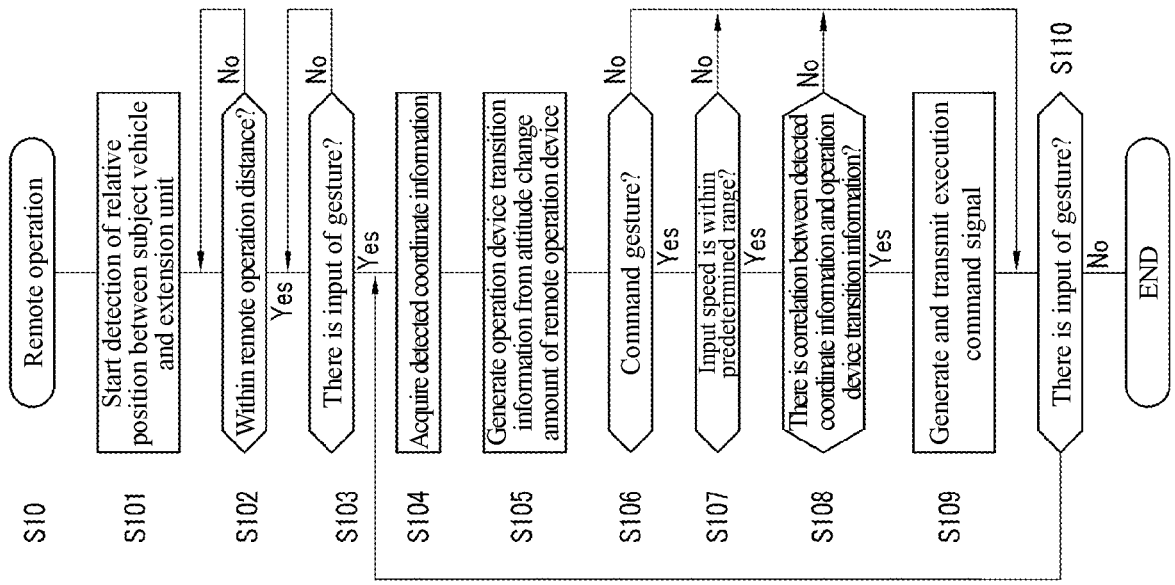
FIG. 10 is a flowchart illustrating a procedure of the remote operation of FIG. 9.

The control flow of the remote parking system 1 of the present embodiment will then be described with reference to FIGS. 9 and 10. Here, a scene will be described in which the reverse parking illustrated in FIG. 2 is executed by the autonomous parking control. FIG. 9 is a flowchart illustrating a control procedure executed in the remote parking system 1 of the present embodiment. FIG. 10 is a flowchart illustrating a procedure in the remote operation device 21 of detecting and determining the gesture and transmitting the execution command signal.

First, when the subject vehicle V arrives at the position P1 in the vicinity of the target parking space TPS, in step S1 illustrated in FIG. 9, the operator U such as the driver turns on the remote parking start switch of the onboard target parking space setting device 11 to select the remote entry mode. In step S2, the target parking space setting device 11 searches for one or more available parking spaces for the subject vehicle V using a plurality of onboard cameras or the like. In step S3, the target parking space setting device 11 determines whether or not there are one or more available parking spaces. When there are one or more available parking spaces, the process proceeds to step S4, while when there are no available parking spaces, the process returns to step S1. When no available parking spaces are detected in step S2, the operator may be informed of this fact via a language display or voice, such as "there are no parking spaces," and this process may be concluded.

In step S4, the target parking space setting device 11 controls the onboard display to display the available parking spaces and prompts the operator U to select a desired parking space. When the operator U selects a specific parking space TPS, the target parking space setting device 11 outputs the target parking position information to the parking route generator 14. In step S5, the parking route generator 14 generates the parking routes R1 and R2 illustrated in FIG. 2 from the current position P1 of the subject vehicle V to the parking space TPS which represents a target parking position. The object deceleration calculator 15 calculates the deceleration start timing in the autonomous parking control based on the object information detected by the object detector 13. The parking routes R1 and R2 generated by the parking route generator 14 are output to the route following controller 16, and the deceleration start timing calculated by the object deceleration calculator 15 is output to the target vehicle speed generator 17.

Through the above processes, the autonomous parking control comes into a standby state; therefore, when the operator U is prompted to accept the start of the autonomous parking control and then accepts the start in step S6, the autonomous travel control in the assist mode is started. In the reverse parking illustrated in FIG. 2, once the subject vehicle V moves forward while turning right from the current position P1 and reaches the position of turn for parking P3, the subject vehicle V moves backward while turning left to the intermediate stop position P4.

In step S7, as the position of the subject vehicle V reaches the intermediate stop position P4, the subject vehicle V is stopped and the operator U is prompted to get off the subject vehicle V. When the operator U is prompted to get off the subject vehicle V in step S7 and gets off with the remote operation device 21, step S7 is followed by step S8, in which the operator U activates the remote operation device 21. This starts the remote operation. Examples of the start input for the remote operation by the remote operation device 21 include the activation of the application installed in the remote operation device 21, the operation of unlocking the doors, the operation of locking/unlocking the doors, and the combination of these and the activation of the application. The subject vehicle V is in a stop state during steps S7 to S9.

In step S9, a pairing process between the remote operation device 21 and the subject vehicle V is performed. When the pairing process of step S9 enables the subject vehicle V to authenticate the remote operation device 21 so that the command can be received, the remote operation is started in step S10.

In the remote control with the remote operation device 21, the detection of the relative position of the extension unit 22 with respect to the subject vehicle V, that is, the relative position of the operator U carrying the extension unit 22 is started in step S101 of FIG. 10. The extension unit 22 receives the extension unit search signals transmitted from the antennas 202a to 202d of the subject vehicle V and measures the radio field intensity of the extension unit search signal from each of the antennas 202a to 202d. The extension unit 22 transmits the measured radio field intensity of the extension unit search signal to the base unit 20. The position detector 201 of the base unit 20 detects the relative position of the extension unit 22 with respect to the subject vehicle V based on the radio field intensities of the antennas 202a to 202d received from the extension unit 22. Through this operation, when the operator U carries the extension unit 22, the relative position of the operator U with respect to the subject vehicle V can be detected. The position detector 201 outputs the detected relative position to the route following controller 16 and the target vehicle speed generator 17 (these may alternatively be the steering angle controller 18 and the vehicle speed controller 19) and transmits the detected relative position to the remote operation device 21.

In the next step S102, when the distance between the subject vehicle V and the extension unit 22 is within a predetermined remote operation distance, the process proceeds to step S103, in which the remote operation device 21 confirms the input of a gesture. When, in step S102, the distance between the subject vehicle V and the extension unit 22 is not within the predetermined remote operation distance, a message such as "Please approach the vehicle within 6 m" is displayed on the touch panel 211.

When the input of a gesture is performed in step S103, this step is followed by step S104, in which the determination unit 215 receives from the storage unit 214 the detected coordinate information indicating the temporal transition in the detected coordinates of the gesture detected by the touch panel 211. That is, when the operator U inputs a gesture on the touch panel 211, the detected coordinate information Dx and Dy generated by the information generator 213 are acquired, while when a gesture is input using the operation automation function, the operation automation information is acquired as the detected coordinate information.

In the next step S105, the information generator 213 extracts the attitude change amount, which is generated due to the input of the gesture to the touch panel 211, from the composite attitude change amount detected by the sensor 212 and stores the extracted attitude change amount in the storage unit 214 as the operation device transition information S.

In step S106, the determination unit 215 compares the detected coordinate information Dx and Dy acquired from the storage unit 214 with the command gesture information and determines whether or not the gesture detected by the touch panel 211 is the command gesture. In addition, when the input gesture is the command gesture, the determination unit 215 determines in the next step S107 whether or not the input speed of the gesture is within a predetermined range. When the input gesture is the command gesture and the input speed is within the predetermined range, the determination unit 215 determines that the command gesture is input. When detecting the operation automation information as the detected coordinate information, the determination unit 215 compares the operation automation information with the command gesture information. The operation automation information is obtained by recording the touch operation of an appropriate gesture, which is to be determined as the command gesture, for automated input of the gesture, and the determination unit 215 therefore determines that the gesture is the command gesture.

When the detected gesture is the command gesture, the process proceeds to the next step S108, in which the determination unit 215 compares the frequency characteristics of the detected coordinate information with the frequency characteristics of the operation device transition information S to determine whether or not there is correlation. When the detected coordinate information acquired by the determination unit 215 is the detected coordinate information Dx and Dy generated by the operator U inputting a gesture on the touch panel 211, then, as illustrated in FIG. 8, for example, the detected coordinate information Dx and the operation device transition information S coincide with each other at least in the frequency characteristics such as a period and a wavelength. The determination unit 215 therefore determines that the detected coordinate information Dx and the operation device transition information S have correlation.

When the determination unit 215 determines that the frequency characteristics of the detected coordinate information Dx and the frequency characteristics of the operation device transition information S have correlation, the process proceeds to the next step S109, in which the command unit 216 generates the execution command and the communication unit 217 transmits the execution command signal to the subject vehicle V. When the input of the gesture is continued in the next step S110, the process returns to step S104, from which the determination of a gesture and the transmission of the execution command signal are repeated.

On the other hand, when the input of a gesture is performed in the remote operation device 21 using the operation automation function, the determination unit 215 acquires the operation automation information from the storage unit 214 instead of the detected coordinate information Dx and Dy. The operation device transition information generated by the information generator 213 does not include the frequency characteristics representing an attitude change amount caused due to the input of a gesture because an attitude change caused due to the input of a gesture does not occur on the remote operation device 21. Accordingly, in step S108, the determination unit 215 compares the operation automation information with the operation device transition information S to determine that there is no correlation, and therefore the execution command signal is not transmitted to the subject vehicle V.

Referring again to FIG. 7, in step S11, when the distance between the subject vehicle V and the extension unit 22 is within the remote operation distance and the execution command signal from the remote operation device 21 is input, the route following controller 16 outputs the target steering angle to the steering angle controller 18. Likewise, when the distance between the subject vehicle V and the extension unit 22 is within the remote operation distance and the execution command signal from the remote operation device 21 is input, the target vehicle speed generator 17 outputs the target vehicle speed to the vehicle speed controller 19. On the basis of the target steering angle from the route following controller 16, the steering angle controller 18 generates a control signal for operating the steering actuator provided in the steering system of the subject vehicle. On the basis of the target vehicle speed from the target vehicle speed generator 17, the vehicle speed controller 19 generates a control signal for operating the accelerator actuator provided in the drive system of the subject vehicle V. This allows the autonomous parking control to be executed in the next step S12.

The processes from step S10 to step S13, which is to be described below, are executed at predetermined time intervals until the subject vehicle V arrives at the target parking space TPS in step S13. In step S13, a determination is made as to whether or not the subject vehicle V has arrived at the target parking space TPS. When the subject vehicle V has not arrived at the parking space TPS, the process returns to step S10, while when the subject vehicle V has arrived at the target parking space TPS, the subject vehicle V is stopped and the process is concluded. Thus, the autonomous travel control in the assist mode is executed along the travel route from the current position P1 of the subject vehicle V to the intermediate stop position P4, and the autonomous travel control in the remote control mode is executed along the travel route from the intermediate stop position P4 to the target parking space TPS.

As described above, according to the remote parking system 1 to which the remote control method and remote control device for a vehicle of the present invention are applied, when the subject vehicle V having the autonomous travel control function is remotely operated with the remote operation device 21, the detected coordinate information Dx and Dy indicating the temporal transition in the detected coordinates of the gesture detected by the touch panel 211 of the controller 21 are acquired, and the change amount of a physical change occurring on the remote operation device 21 is detected to generate the operation device transition information S indicating the temporal transition in the change amount. Then, the frequency characteristics of the detected coordinate information Dx and Dy are compared with the frequency characteristics of the operation device transition information S to determine whether or not there is correlation, and when there is correlation, the subject vehicle V is controlled to execute the autonomous travel control. That is, when the frequency characteristics of the detected coordinate information Dx and Dy and the frequency characteristics of the operation device transition information S have correlation, a determination can be made that the gesture is input by the touch operation of the operator U. On the other hand, when the operation automation information is acquired as the detected coordinate information, it is detected that the detected coordinates of a gesture detected by the touch panel 211 using the operation automation information are changed, but no physical change occurs on the remote operation device 21; therefore, the frequency characteristics of the operation automation information and the frequency characteristics of the operation device transition information S have no correlation, and a determination can be made that the gesture is not input by the touch operation of the operator U. When the gesture is not input by the touch operation of the operator U, the execution command signal is not transmitted to the subject vehicle V, and the input of a gesture using the operation automation function can thus be suppressed.

Moreover, the change in an attitude occurring on the remote operation device 21 is used as the physical change occurring on the remote operation device 21; therefore, a determination can be made as to whether or not the operator U inputs the gesture in a state of holding the remote operation device 21, and the input of a gesture using the operation automation function can thus be suppressed.

Furthermore, a determination is made as to whether or not the gesture is a command gesture that is preliminarily set, and when the gesture is the command gesture, the frequency characteristics of the detected coordinate information are compared with the frequency characteristics of the operation device transition information to determine whether or not there is correlation. Then, when there is correlation between the frequency characteristics of the detected coordinate information and the frequency characteristics of the operation device transition information, the subject vehicle V is controlled to execute the autonomous travel control. This can prompt the operator U to input a specified command gesture by the touch operation, and the input of a gesture using the operation automation function can thus be suppressed.

In addition, a mobile information terminal that serves as the remote control device 21 by executing a process of installed application software is used as the remote control device 21, and a physical change occurring on the remote control device 21 is detected by a sensor that is preliminarily provided in the mobile information terminal. This can reduce the cost because it is not necessary to newly provide a sensor in the remote operation device 21.

Moreover, in the present embodiment, when the gesture becomes not detected, the subject vehicle V is controlled to stop the autonomous parking control. Therefore, the operation of controlling the subject vehicle V to stop the autonomous parking control is not necessary, and the remote operation of the subject vehicle V is thus easy.

Second Embodiment

The description will then be made for a second embodiment of the remote parking system to which the vehicle remote control method and vehicle remote control device of the present invention are applied. For the same configurations as those of the first embodiment, the same reference numerals as those of the first embodiment will be used, and detailed description thereof will be omitted.

In the present embodiment, the change in the pressure applied to the touch panel 211 is used as the physical change occurring on the remote operation device 21. When the sensor 212 includes a pressure sensor that detects the pressure of the touch panel 211, the change in the pressure applied to the touch panel 211 can be detected using the detection value of that pressure sensor. When the touch panel 211 is a pressure-sensitive touch panel, or when the touch panel 211 is provided with a pressure sensor, the detection value detected by the touch panel 211 may be used.

When a gesture is input by the touch operation on the touch panel 211 of the remote operation device 21, the pressure of the touch operation is not constant, and the pressure may be high at a position at which the touch operation is easy to perform and low at a position at which the touch operation is difficult to perform. On the contrary, at a position at which the touch operation is difficult to perform, the pressure may be unconsciously increased to reliably perform the touch operation, and at a position at which the touch operation is easy to perform, the pressure may be decreased. Thus, the pressure of the touch operation at the time of gesture input varies depending on how the operator U holds the remote operation device 21, the habit of the touch operation, etc.

Figure 11:
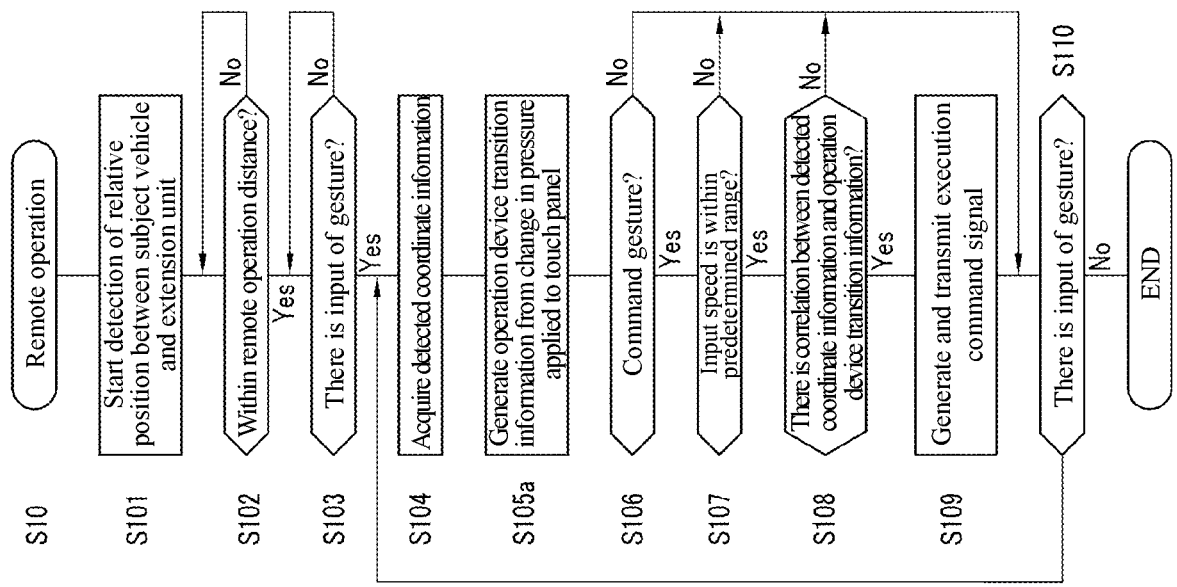
FIG. 11 is a flowchart illustrating a procedure of the remote operation of a second embodiment.

In the present embodiment, as illustrated in FIG. 11, the process proceeds from step S101 to step S104 in the same procedure as in the first embodiment, but in step S105a, the change amount of the pressure applied to the touch panel 211 is detected, and the information generator 213 generates the operation device transition information indicating the temporal transition in the change amount. Then, in steps S106 to S108, as in the first embodiment, the determination unit 215 compares the frequency characteristics of the detected coordinate information with the frequency characteristics of the operation device transition information to determine whether or not there is correlation. Then, when there is correlation between the frequency characteristics of the detected coordinate information and the frequency characteristics of the operation device transition information, the command unit 216 generates the execution command signal and the communication unit 217 transmits the execution command signal to the subject vehicle V in step S109. On the other hand, when there is no correlation between the frequency characteristics of the detected coordinate information and the frequency characteristics of the operation device transition information, the execution command signal is not transmitted to the subject vehicle V.

Thus, the change in the pressure applied to the touch panel 211 is used as the physical change occurring on the remote operation device 21; therefore, a determination can be made as to whether or not the operator U actually performs the touch operation on the touch panel 211 to input a gesture, and the input of a gesture using the operation automation function can thus be suppressed.

Third Embodiment

The description will then be made for a third embodiment of the remote parking system to which the vehicle remote control method and vehicle remote control device of the present invention are applied. For the same configurations as those of the first embodiment, the same reference numerals as those of the first embodiment will be used, and detailed description thereof will be omitted.

In the first embodiment and the second embodiment, it is necessary to input gestures a plurality of times in order to generate the operation device transition information. That is, to accurately generate the operation device transition information, it is necessary to increase the number of sampling the change amount of the physical change occurring on the remote operation device 21, and therefore the start of the autonomous parking control of the subject vehicle V is delayed. The present embodiment is to solve such a problem so that the autonomous parking control of the subject vehicle V can be started rapidly.

Figure 12:
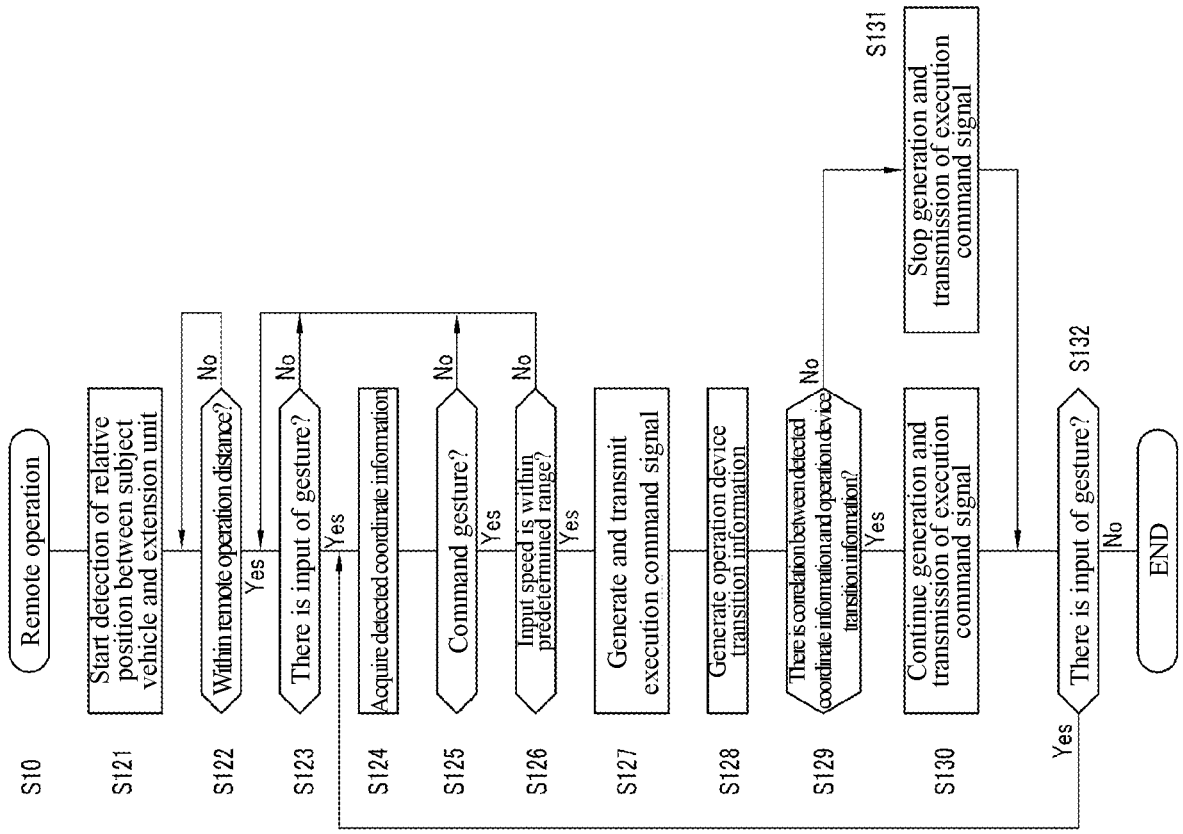
FIG. 12 is a flowchart illustrating a procedure of the remote operation of a third embodiment.

In the present embodiment, as illustrated in FIG. 12, steps S121 to S124 are the same processes as steps S101 to S104 of the first embodiment illustrated in FIG. 10. In addition, steps S125 to S127 are the same processes as steps S106, S107, and S109 of the first embodiment. That is, in the present embodiment, the determination unit 215 previously determines whether or not the input gesture is the command gesture, and when the input gesture is the command gesture, the command unit 216 generates the execution command signal and the communication unit 217 transmits the execution command signal to the subject vehicle V.

In the next step S128, the information generator 213 may generate the operation device transition information from the attitude change amount of the remote operation device 21 as in step S105 of the first embodiment illustrated in FIG. 10 or may also generate the operation device transition information from the change in the pressure applied to the touch panel 211 as in step S105a of the second embodiment illustrated in FIG. 11.

In the next step S129, in the same manner as in step S108 of the first embodiment illustrated in FIG. 10, the determination unit 215 compares the frequency characteristics of the detected coordinate information with the frequency characteristics of the operation device transition information to determine whether or not there is correlation. Then, when there is correlation between the frequency characteristics of the detected coordinate information and the frequency characteristics of the operation device transition information, the generation and transmission of the execution command signal are continued in step S130. On the other hand, when there is no correlation between the frequency characteristics of the detected coordinate information and the frequency characteristics of the operation device transition information, the generation and transmission of the execution command signal are stopped in step S131.

As described above, in the present embodiment, a determination is made as to whether or not the gesture is a command gesture that is preliminarily set, and when the gesture is the command gesture, the subject vehicle V is controlled to execute the autonomous travel control. Then, after the execution of the autonomous travel control of the subject vehicle V, the frequency characteristics of the detected coordinate information are compared with the frequency characteristics of the operation device transition information to determine whether or not there is correlation, and when there is correlation, the subject vehicle V is controlled to continue the autonomous travel control, while when there is no correlation, the subject vehicle V is controlled to stop the autonomous travel control. Through this operation, the autonomous parking control of the subject vehicle V can be started rapidly. Moreover, when the input of a gesture is not performed by the touch operation of the operator U but is performed using the operation automation function after the start of the autonomous parking control of the subject vehicle V, the autonomous parking control of the subject vehicle V is stopped, and the input of a gesture using the operation automation function can thus be suppressed.

Figure 13:
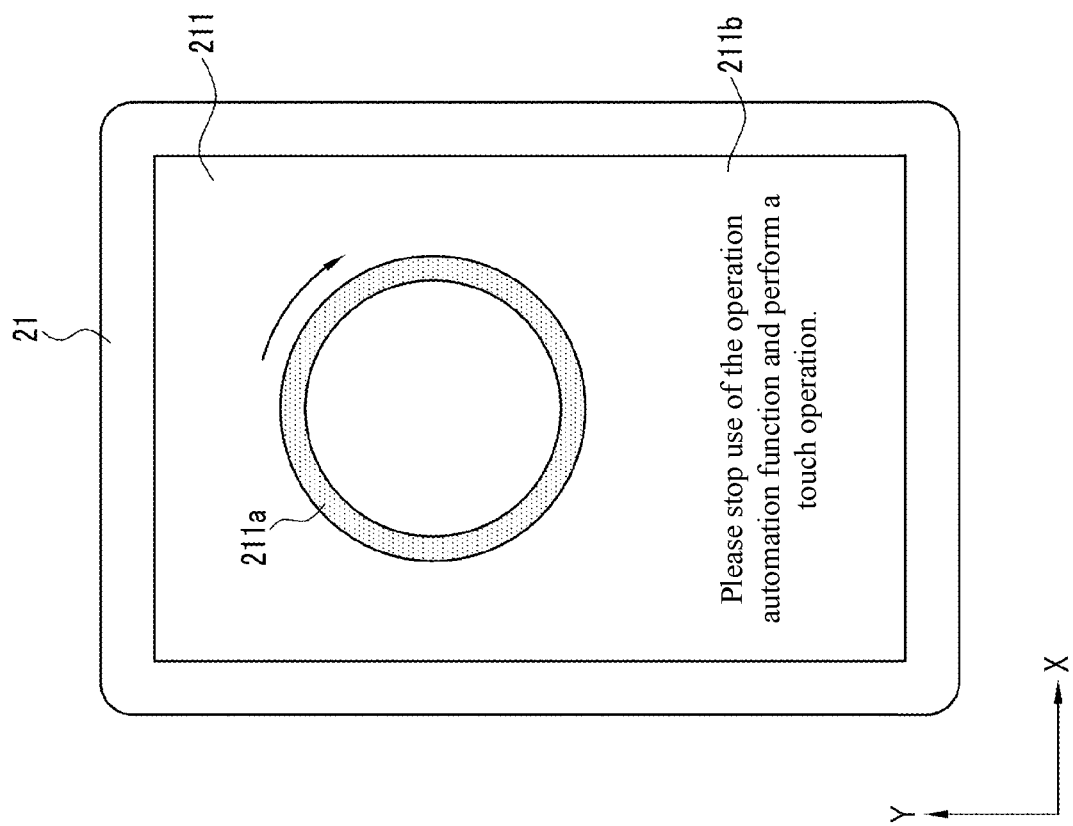
FIG. 13 is an explanatory diagram illustrating a state in which guidance information is displayed on the touch panel of the remote operation device.

In the above first to third embodiments, when the operator U inputs a gesture using the operation automation function of a mobile information terminal, the autonomous travel control of the subject vehicle V is not executed, but at the same time, a guidance may be presented to the operator U so as to prompt the operator U to input a gesture by the touch operation. In the example illustrated in FIG. 13, for example, guidance information 211b such as "Please stop use of the operation automation function and perform a touch operation" is displayed on the touch panel 211 of the remote operation device 21. This can notify the operator U that the operation automation function cannot be used and that a gesture needs to be input by the touch operation. The guidance information 211b may be presented by voice, or the voice and the display by the touch panel 211 may be used in combination.

DESCRIPTION OF REFERENCE NUMERALS

1 Remote parking system
11 Target parking space setting device
12 Vehicle position detector
13 Object detector
14 Parking route generator
15 Object deceleration calculator
16 Route following controller
17 Target vehicle speed generator
18 Steering angle controller
19 Vehicle speed controller
20 Base unit
22 Extension unit
21 Remote operation device
211 Touch panel
212 Sensor
213 Information generator
214 Storage unit
215 Determination unit
216 Command unit
217 Communication unit
V Subject vehicle
TPS Target parking space
R1, R2 Parking route W Wall (obstacle)
H1, H2 House (obstacle)
WD Garden tree (obstacle)

The invention claimed is:

1. A vehicle remote control method comprising:
when remotely operating a vehicle having an autonomous travel control function by a remote operation device,
acquiring detected coordinate information indicating a temporal transition in detected coordinates of a gesture detected by a touch panel of the remote operation device;
detecting a change amount of a physical change occurring on the remote operation device to acquire operation device transition information indicating a temporal transition in the change amount;
comparing frequency characteristics of the detected coordinate information with frequency characteristics of the operation device transition information to determine whether or not there is correlation, wherein the frequency characteristics of the detected coordinate information and the frequency characteristics of the operation device transition information comprise at least one of period or wavelength; and
when there is correlation between the frequency characteristics of the detected coordinate information and the frequency characteristics of the operation device transition information, controlling the vehicle to execute autonomous travel control.

2. The vehicle remote control method according to claim 1, wherein the physical change occurring on the remote operation device is a change in an attitude of the remote operation device.

3. The vehicle remote control method according to claim 1, wherein the physical change occurring on the remote operation device is a change in a pressure applied to the touch panel.

4. The vehicle remote control method according to claim 1, comprising:
determining whether or not the gesture is a command gesture that is preliminarily set;
when the gesture is the command gesture, comparing the frequency characteristics of the detected coordinate information with the frequency characteristics of the operation device transition information to determine whether or not there is correlation; and
when there is correlation between the frequency characteristics of the detected coordinate information and the frequency characteristics of the operation device transition information, controlling the vehicle to execute the autonomous travel control.

5. The vehicle remote control method according to claim 1, wherein
the remote operation device is a mobile information terminal that serves as the remote operation device by executing a process of installed application software, and
the physical change occurring on the remote operation device is detected by a sensor that is preliminarily provided in the mobile information terminal.

6. The vehicle remote control method according to claim 1, comprising:
when the gesture becomes not detected, stopping the autonomous travel control of the vehicle.

7. The vehicle remote control method according to claim 1, comprising:
detecting the detected coordinate information indicating the temporal transition in the detected coordinates of the gesture detected by the touch panel of the remote operation device, wherein,
when the change amount of the physical change occurring on the remote operation device cannot be detected, the remote operation device presents guidance information to an operator so as to prompt the operator to input the gesture by a touch operation of the operator.

8. A vehicle remote control method according to claim 1, comprising:
when remotely operating a vehicle having an autonomous travel control function by a remote operation device,
acquiring detected coordinate information indicating a temporal transition in detected coordinates of a gesture detected by a touch panel of the remote operation device;
detecting a change amount of a physical change occurring on the remote operation device to acquire operation device transition information indicating a temporal transition in the change amount;
comparing frequency characteristics of the detected coordinate information with frequency characteristics of the operation device transition information to determine whether or not there is correlation
when there is correlation between the frequency characteristics of the detected coordinate information and the frequency characteristics of the operation device transition information, controlling the vehicle to execute autonomous travel control;
determining whether or not the gesture is a command gesture that is preliminarily set;
when the gesture is the command gesture, controlling the vehicle to execute the autonomous travel control;
after starting execution of the autonomous travel control of the vehicle, comparing the frequency characteristics of the detected coordinate information with the frequency characteristics of the operation device transition information to determine whether or not there is correlation;
when there is correlation between the frequency characteristics of the detected coordinate information and the frequency characteristics of the operation device transition information, controlling the vehicle to continue the autonomous travel control; and
when there is no correlation between the frequency characteristics of the detected coordinate information and the frequency characteristics of the operation device transition information, controlling the vehicle to stop the autonomous travel control.

9. A vehicle remote control device for remotely operating a vehicle having an autonomous travel control function by a remote operation device, the vehicle remote control device comprising:
a determination unit configured to:
detect a change amount of a physical change occurring on the remote operation device;
acquire operation device transition information indicating a temporal transition in the change amount;
acquire detected coordinate information indicating a temporal transition in detected coordinates of a gesture detected by a touch panel of the remote operation device; and
compare frequency characteristics of the detected coordinate information with frequency characteristics of the operation device transition information to determine whether or not there is correlation, wherein the frequency characteristics of the detected coordinate information and the frequency characteristics of the operation device transition information comprise at least one of period or wavelength; and a command unit configured to, when there is correlation between the frequency characteristics of the detected coordinate information and the frequency characteristics of the operation device transition information, control the vehicle to execute autonomous travel control.

* * * * *